(12) United States Patent
Habeck

(10) Patent No.: US 6,835,164 B2
(45) Date of Patent: Dec. 28, 2004

(54) SHIFT-CONTROL METHOD FOR A VEHICULAR AUTOMATIC TRANSMISSION

(75) Inventor: Dirk Habeck, Langenargen (DE)

(73) Assignee: ZF Friedrichshafen AG (DE)

( * ) Notice: Subject to any disclaimer, the term of this patent is extended or adjusted under 35 U.S.C. 154(b) by 0 days.

(21) Appl. No.: 10/422,873

(22) Filed: Apr. 24, 2003

(65) Prior Publication Data

US 2004/0009843 A1 Jan. 15, 2004

(30) Foreign Application Priority Data

Jul. 15, 2002 (DE) .......................................... 102 31 817

(51) Int. Cl.$^7$ .............................................. F16H 61/26
(52) U.S. Cl. ...................................... 477/132; 477/149
(58) Field of Search ............................... 477/149, 132, 477/144

(56) References Cited

U.S. PATENT DOCUMENTS 4,476,747 A * 10/1984 Kawamoto .................. 477/146

FOREIGN PATENT DOCUMENTS

| DE | 38 81 362 T2 | 6/1989 | | |
|---|---|---|---|---|
| DE | 691 10 241 T2 | 4/1992 | | |
| EP | 322111 A | * 6/1989 | ........... | B60K/41/18 |
| EP | 482689 A | * 4/1992 | ........... | B60K/41/06 |

OTHER PUBLICATIONS

German Search Report.

* cited by examiner

*Primary Examiner*—Dirk Wright
(74) *Attorney, Agent, or Firm*—Milde & Hoffberg LLP

(57) ABSTRACT

A method for controlling a gear shift in an automatic transmission of a motor vehicle that is carried out as a deceleration shift of at least one engaging shifting element, without use of a mechanical free-wheeling condition. To increase the ride comfort, it is proposed that during the shifting sequence of the deceleration shift, a free-wheeling condition is simulated by a slip operation or by an opening of a second shift element of the automatic transmission, that is located in the power flow path, preferably using a start-up shift element of the automatic transmission.

26 Claims, 2 Drawing Sheets

SHIFT-CONTROL METHOD FOR A VEHICULAR AUTOMATIC TRANSMISSION

FIELD OF THE INVENTION

The invention relates to the field of vehicular automatic transmissions, and more particularly to a method for controlling a gear shift in an automatic transmission of a motor vehicle.

BACKGROUND OF THE INVENTION

Improving the shift quality remains an important goal in the development of multi-ratio automatic transmissions. The shift quality has a significant impact on the comfort of an automatic transmission for passenger cars. Great effort is made to further raise the quality level for all modes of shifting, for example, acceleration upshift and downshift, deceleration upshift and downshift. Achieving a good shift quality is particularly important during coasting-to-stop shifts, in other words, during deceleration downshifts at low speeds, without the demand of a motor load by the driver, because the driver does not expect a noticeable reaction of the drive train. In automatic transmissions where deceleration shifting, and in particular, coasting-to-stop shifting occurs due to a simple overlapping of two friction shift elements, without a free-wheeling condition as an additional shift element, it is a known fact that the shifting sequence is difficult to implement. Due to the essentially load-free condition of the engine and the low shift pressure, corresponding to the load condition, for the engaging shift element of the respective deceleration shift, all variations as well as temporary torque and speed changes that act upon the respective shift element have a particularly strong effect on the shifting sequence, with the result of variations in the shifting quality. Examples of such variables disturbing the control over overlapping shifting includes the idle speed control of the engine, restarting of the engine after an active deceleration shut down of the engine, a changing brake gradient when the vehicle is coasting, and also different transmission oil temperatures.

SUMMARY AND OBJECTS OF THE INVENTION

The present invention provides an improved method for controlling a gear shift in an automatic transmission of a motor vehicle, especially where said gear shift is carried out as a deceleration shift, with at least one engaging shift element and without a mechanical free-wheeling condition.

This objective is accomplished by simulating a free wheeling condition by implementing a slip operation, or by an opening of a second shift element of the automatic transmission that is located in the power flow path, during the shifting sequence of the deceleration shift.

Thus, the present invention seeks to simulate a mechanical free-wheeling condition, which is not actually involved or not present with a deceleration shift, through a slip operation or an opening of an additional shift element of the automatic transmission, whereby the additional shift element is present in the flow of power of the automatic transmission independent of the shift element that engages at the deceleration shift. Through the slip operation, or the opening of the additional shift element, a drive of the automatic transmission is, partially or entirely, decoupled during the shifting sequence of the deceleration shift from a drive motor that drives the automatic transmission, such that no reaction forces or reaction factors of the deceleration shift that impact the comfort, are transferred to a drive axle of the vehicle.

Preferably, the freewheeling condition of the deceleration shift is simulated via a start-up clutch or a start-up brake of the automatic transmission, as an additional function of the start-up shift element, aside from the known function of shifting into gear, and if applicable, to decouple the engine during a vehicle stop (reduction of creep tendency). Prior to the deceleration shift, during the normal driving operation of the vehicle, the start-tip shift element is closed. At the end of the deceleration shift, the start-up element will again be closed, until the vehicle comes to a stop, and can be partially or fully opened in the case of an active stop-decoupling function when the vehicle is stopped ("standby control"). Since a sensitively operating pressure or speed control of the start-up shift element is already present, for example for the position change shifts or for the stop-decoupling function, the additional expenditure for the application of the additional function subject to the present invention is correspondingly low.

These and other objects and features of the present invention will become more fully apparent from the following description and appended claims taken in conjunction with the accompanying drawings, in which like numerals refer to like parts.

BRIEF DESCRIPTION OF THE DRAWINGS

Below, the invention will be explained in greater detail based on the following FIGS. 1 and 2, of which.

DETAILED DESCRIPTION OF THE PREFERRED EMBODIMENTS

Figure 1:
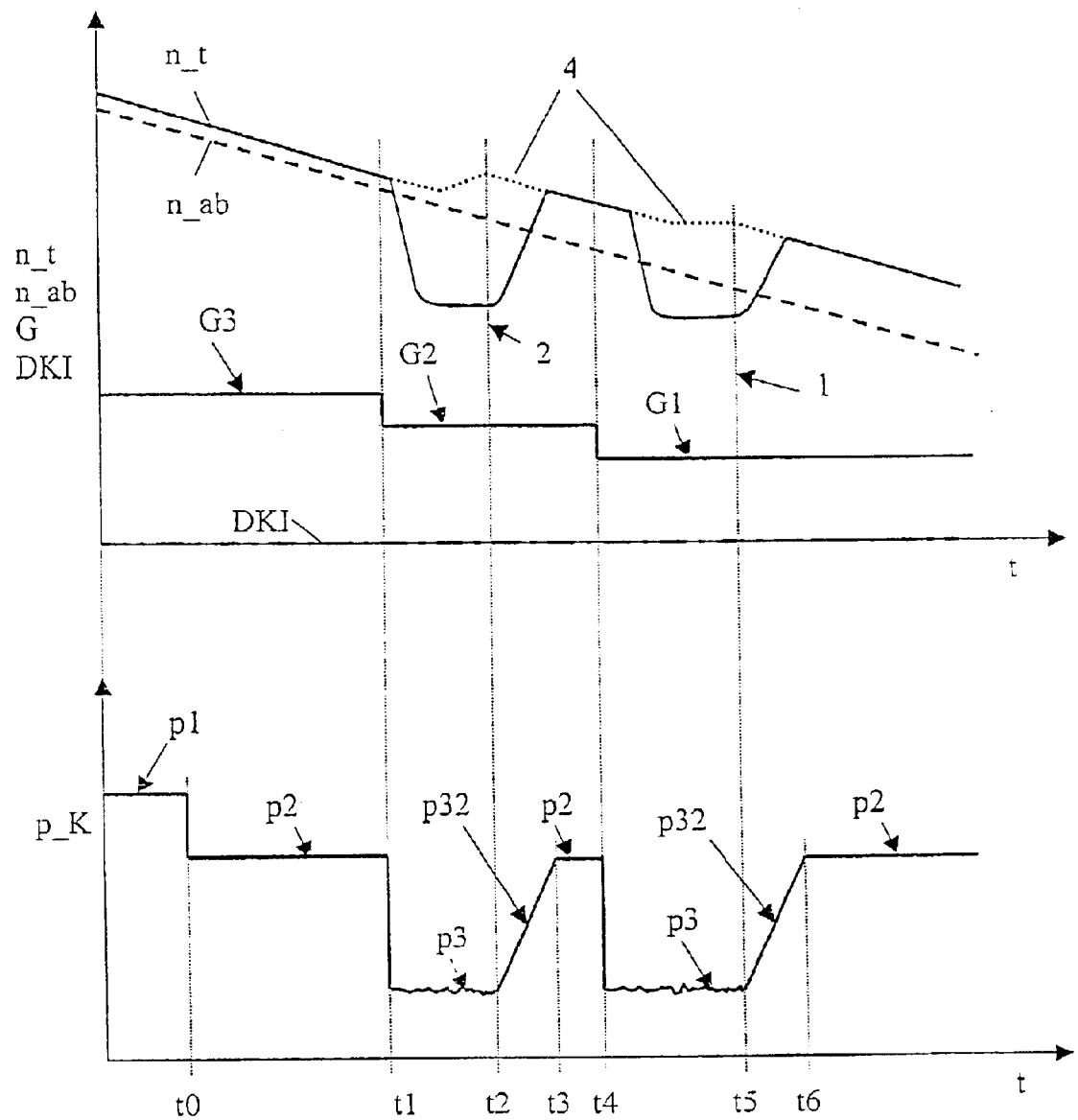
FIG. 1 shows the time flow of an exemplary deceleration downshift subject to the invention.
Figure 2:
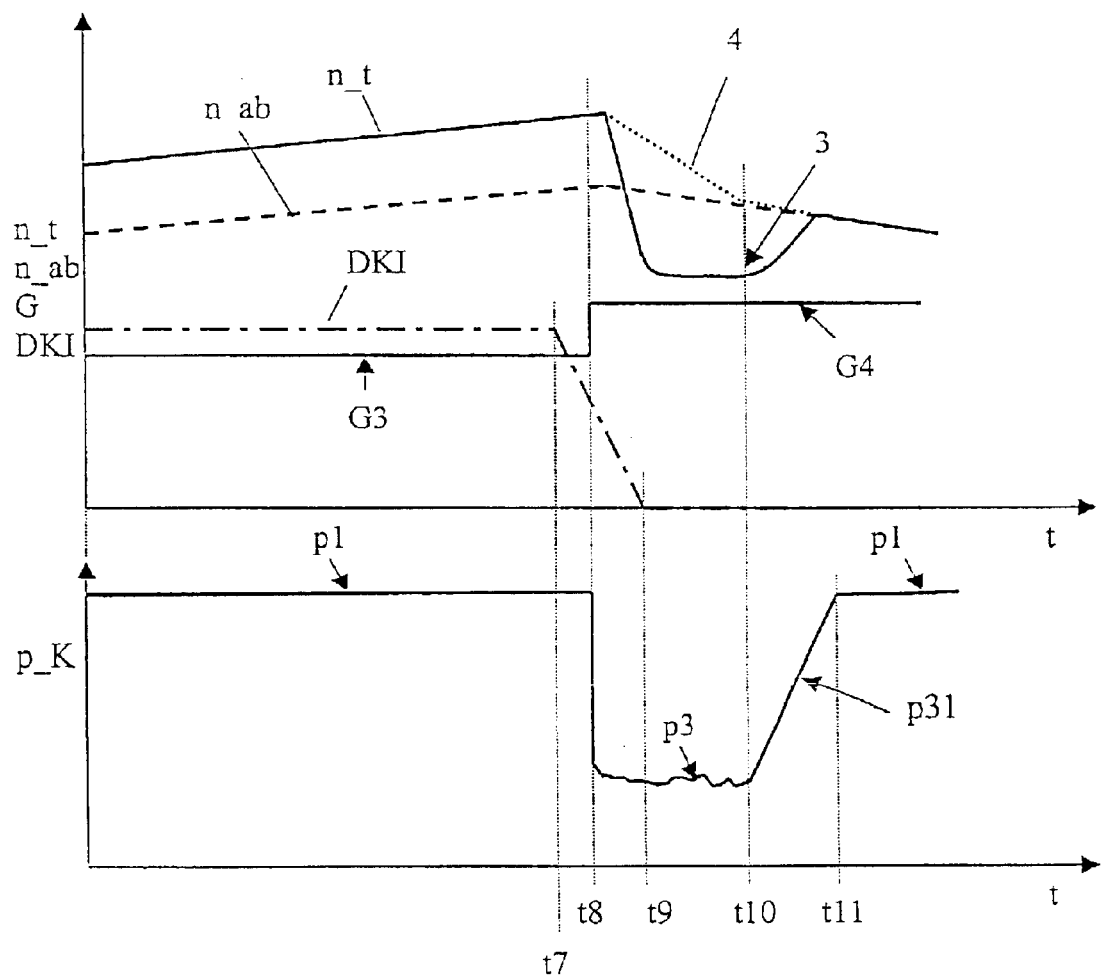
FIG. 2 shows a time flow of an exemplary deceleration upshift subject to the invention.

The upper part of FIGS. 1 and 2 shows, using a solid line, the time sequence of a turbine speed $n\_t$ as the input speed of the automatic transmission, and uses a dashed line to show the time sequence of a corresponding output speed $n\_ab$ of the automatic transmission, during an exemplary coasting process of the vehicle, or of an exemplary load downshift of the automatic transmission, respectively, by using the method of the present invention. For comparison purposes, a turbine speed profile 4 that would result according to the state-of-the-art, that is, without applying the method according to the present invention—is drawn as a dotted line. G1, G2, G3 and G4 identify the first, second, third and fourth gear modes of a target gear G of the automatic transmission. DKI is the designation for a butterfly valve of the drive motor that drives the automatic transmission, as an equivalent signal of a load target provided by the driver via the gas pedal. The respective shift commands for shifting gears are provided by a transmission control device in a typical fashion, for example as a shift characteristic that corresponds to the output speed $n\_ab$ of the automatic transmission (or to a driving speed of the motor vehicle) and of the angle of the butterfly valve DKI (or the angle of the gas pedal, or otherwise as the load target provided by the driver), or due to a manual shift command that the driver requests via a selector lever.

The lower part of the two figures shows, in a solid line, a time sequence of a clutch pressure $p\_K$, that according to the present invention, is set at a start-up shift element of the automatic transmission. Similar principles are also applicable for application to other shift elements within the power flow path, that may also be controlled to simulate the freewheeling condition of the respective deceleration shift.

FIG. 1 shows the time sequence of two successive deceleration downshifts, from the third gear G3 to the second gear G2, and then to the first gear G1, during the coasting procedure of the motor vehicle. As is apparent from FIG. 1, the output speed n_ab drops continuously during coasting, in the shown example, with a constant gradient. At first, the automatic transmission is in third gear G3 and the clutch pressure p_K of the start-up shift element is at an initial pressure p1. The pressure level designated with p1 is, thus, a "pressure outside of shifting" that is known from the state-of-the-art that is predetermined by the transmission control device, in relation to the torque and/or the gear, for example, which keeps the clutch or brake from slipping.

At a time t0, shift-mode-specific start-up conditions for triggering the function subject to the invention are fulfilled, where said function simulates a free-wheeling condition, wherein a mechanical freewheel device is not actually present for this purpose, specifically for the coasting-to-stop shift of the coasting process. Such starting conditions, specifically for the coasting process with an imminent coasting-to-stop shift, are particularly a status "automatic transmission in deceleration mode", with a butterfly valve angle DKI or a gas pedal angle of near or at zero (from an idle state), a status "start-up shift element closed", falling below an output speed threshold, a status "stepped on vehicle brake" generated, for example, via a brake light signal or brake pressure signal, as a substitute for the status "stepped on vehicle brake" exceeding an output speed gradient, as well as the current gear of the automatic transmission. The individual conditions or parameters that form the start conditions of the simulation of a free-wheeling condition in the course of the coasting of the motor vehicle may, of course, also be logically combined with an "AND" and/or an "OR" operation. Likewise, a more complex algorithm may be implemented, for example employing models, neural networks, fuzzy logic, or other control paradigms.

According to the invention, upon recognition of the shift-mode-specific start conditions of the coasting process, the clutch pressure p_K of the start-up shift element that is used for simulating the free-wheeling condition of the coasting-to-stop shift is lowered from the initial pressure p1 prior to the deceleration shift to a defined stand-by pressure p2. This pressure decrease can occur abruptly or be moderated via a linear or non-linear filter function. The pressure level p2 is higher than a known fill pressure of the start-up shift element, such that the start-up shift element can transfer at least the present deceleration factor without slip, if required taking into account a safety allowance. In this manner, the start-up shift element can be returned immediately to its initial state "start-up element closed" with the clutch pressure level p1, if the driver, prior to reaching the shift point of the first coasting-to-stop shift from the third into the second gear (target shifting G3→G2 at the time t1) that has been preset in a typical manner, interrupts the coasting process, by, for example, stepping on the gas pedal. In one embodiment, it is preferred that the stand-by pressure p2 be preset corresponding to a transmission temperature. That is, the pressure p2 may be controlled to an optimum level based on the transmission temperature, for example measured by the fluid therein.

According to the invention, the clutch pressure p_K of the start-up element is at time t1, with the shift command G3→G2, lowered to a defined open pressure p3, such that the start-up shift element is at least taken to a defined slip operation or is fully opened. Preferably, the pressure level p3 is in the range of the fill pressure of the start-up shift element, such that a piston of a hydraulic servo-device of the start-up shift element just barely contacts the discs of the start-up shift element. The pressure reduction of the clutch pressure p_K, from p2 to p3, preferably is carried out abruptly, although it can also occur in a moderated manner via an applicable non-linear filter function. Due to the pressure decrease of the clutch pressure p_K to p3, the turbine speed n_t drops quickly to a value in the range of an idle speed of the drive motor, which is not felt as disturbing by the driver of the motor vehicle, in particular because of the relatively small change in the motor speed. The motor vehicle continues to decelerate without delay. The brief time offset between the gear shift command G3→G2 and the reaction of the turbine speed n_t is a consequence of the obligatory reaction times of the hydraulic control and the servo devices of the shift-mode-specific controlled shift elements.

One advantageous embodiment provides that the open pressure p3 exhibit the same pressure level as the fill pressure of the start-up shift element that has been determined adaptively during the course of a standard de-coupling function. In this manner, the actual opening and slip behavior of the start-up shift element is taken into account in an advantageous manner. Since the fill pressure of the start-up shift element is typically adapted based on at least the transmission temperature, the simulation of a freewheeling condition of a deceleration shift, according to the present invention, also exhibits a transmission temperature compensation. For the simulation of a free-wheeling condition at decelerations shifts, an pressure application offset can be superimposed on the fill pressure of the start-up shift element that has been determined within the scope of the normal stop decoupling function, in order not to open the start-up shift element too far, and to improve the reactivity when exiting the function, that is, when the simulation of the free-wheeling condition is terminated. This pressure offset may be specified, for example, as a function of one or more of the following parameters: shift mode, current gear, torque to be transmitted, angle of butterfly valve or gas pedal, speed of motor or turbine, and temperature of transmission. The pressure offset can, of course, also be adaptable. Expediently, the pressure application offset itself has no influence on the normal stop decoupling function.

Depending on the pre-specification of the shift-mode-specific start-up conditions, the moment at which the start-up conditions of the simulation of the freewheeling condition are met can coincide with the moment of a manual deceleration downshift that a driver would demand. The consequence is that the clutch pressure p_K is then lowered from the initial pressure p1 directly to the open pressure p3, prior to shifting.

At a time t2, a synchronization point 2 of the second gear G2 is achieved. The theoretical synchronization speed of the new gear can be computed in a conventional manner, for example from the output speed n_ab and the known shift step. As can be seen from the turbine speed profile 4 that has been included in the figures for comparison purposes, without the method according to the present invention, up to this moment t2, the turbine speed n_t would have to be raised up to the new synchronization speed, due to the overlapping shift, which is particularly sensitive to disturbances, and thus affects comfort due to the low differential speed and the low shift pressure corresponding to the torque to be transmitted.

By reaching, or at least approximately reaching, the synchronization point 2 of the second gear G2 as the new target gear, the turbine speed n_t is raised to the speed level of the new gear by a closing procedure of the start-up shift element, such that the start-up shift element can again transmit the present deceleration factor. In the example presented, a pressure ramp p32 is commenced for this purpose, that raises the clutch pressure p_K from the open pressure p3 again to the stand-by pressure p2. The pressure gradient, or the duration t3-t2, of the pressure ramp p32 is preferably applied in a gear-dependent manner to achieve optimum shifting comfort. Of course, the pressure increase from p3 to p2 can also be achieved via application of a non-linear filter function that may also be applied corresponding to the respective gear. In a different embodiment, the pressure increase from p3 to p2 can be achieved via a known turbine speed or differential speed control of the start-up shift element, for example, using an already existing closing control of the stop decoupling function.

In another embodiment, it is preferred that the stand-by pressure p2 be specified corresponding to the open pressure p3 or corresponding to the fill pressure of the shift element that is used to simulate the freewheeling condition of the coasting-to-stop shift.

As is further presented in FIG. 1, a second coasting-to-stop shift from the second to the first gear (G2→G1) follows the first coasting-to-stop shift from the third to the second gear (G3→G2). The shifting sequence largely corresponds to the shifting sequence described above, whereby t4 designates the time of the shift command. When the shift command for the target gear change G2→G1 is present, the clutch pressure p_K of the start-up shift element is lowered from p2 to p3 (in the shown example abruptly) and remains at this pressure level until the synchronization point 1 of the first gear G1 is reached. When the synchronization point 1 of the first gear G1 at the time t5 is reached, the pressure ramp p32 starts, and in course the clutch pressure p_K is raised to p2 at the time t6. As can be seen from the turbine speed profile 4, drawn for comparison purposes, without the method according to the present invention, the turbine speed step of gear change G2→G1 to be shifted for an overlapping shift is again lowered in comparison to gear change G3→G2, and is, therefore, even more critical for comfort.

Not shown in FIG. 1 is the stop time of the motor vehicle (output speed n_ab=zero). If in the continued time sequence the coasting procedure of the motor vehicle is terminated, for example through the driver stepping on the gas pedal, the pressure level of the start-up shift element is immediately raised back to the initial pressure p1, to ensure a slip-free operation of the start-up shift element. At a stand-still of the motor vehicle, the clutch pressure p_K of the start-up shift element can again be returned to the initial pressure p1, if no stop decoupling function is provided, or if it is not be activated. It can also be taken to the adaptive fill pressure of the start-up shift element, in the event a stop decoupling function is activated at a stand-still of the motor vehicle. If the transmission provides that at a standstill of the vehicle, without an active stop decoupling function, a different pressure level than the initial pressure p1 is set in the start-up gear of the automatic transmission, the stand-by pressure p2 is, of course raised to this pressure level instead of to p1.

If, in the course of the simulation of the free-wheeling condition, the function or mode is exited, for example because the driver steps on the gas pedal, then a special function, including a selectively applied motor intervention, can be provided, which increases the driving comfort simultaneously with a controlled increase of the clutch pressure to the respective pressure level outside of shifting conditions in the currently set gear, in order to influence (in general to reduce but in special cases also to increase) the torque that is to be transmitted by the start-up shift element and/or to delay or dampen the torque build-up. The controlled increase of the clutch pressure itself to the required pressure level of the currently used gear can be carried out, for example, as a function of one or more of the torque to be transmitted, the motor or turbine speed, the output speed, the relative change in the angle of the butterfly valve or of the gas pedal, the angle gradient of the butterfly valve or of the gas pedal, and the transmission temperature. A controlled increase of the clutch pressure from the stand-by pressure p2 is preferably carried out abruptly, because the start-up shift element had still been force-locked. A controlled increase of the clutch pressure from the open pressure p3 is preferably comfort-oriented "soft". The start-up shift element may also be controlled based on permissible heat dissipation thereof, with comfort sacrificed in favor of maintaining the transmission and vehicle within safe operating parameters. If the heat dissipation is too high, typically the start-up element is fully engaged, for example by applying pressure p1.

Of course, application of a motor intervention function can also be provided during the "normal" controlled increase of the clutch pressure p_K from the open pressure p3 to the stand-by pressure p2.

Based on FIG. 2, the sequence of a deceleration upshift, subject to the invention, is described using the example of a load reduction shift from the third gear G3 to the fourth gear G4. As is apparent in FIG. 2, up to the time t7, the automatic transmission is operated under a specified angle of the butterfly valve DKI, under load, in the acceleration mode, the output speed n_ab and the turbine speed n_t as well, increase until time t7, and in the example presented, the automatic transmission is in third gear. At the time t7, the driver removes his load demand, and at the time t9 the angle of the butterfly valve DKI or the angle of the gas pedal is reduced to a value of zero.

Because an upshift characteristic is exceeded, which is typically defined by the output speed n_ab and the angle of the butterfly valve, the transmission control device triggers a shift command for upshifting from the third gear G3 to the fourth gear G4 at the time t8. At the same time as this shift command G3→G4, the shift-mode-specific start-up conditions are met in this example as well, which implements the function according to the present invention for the simulation of a free-wheeling condition, in the absence of a mechanical freewheel provided for this purpose, especially for the now commencing load reduction shift of the automatic transmission. Such starting conditions, especially for the load reduction shift, are in particular an upshift command of the automatic transmission in connection with a status "acceleration/deceleration change of the automatic transmission", an upshift command of the automatic transmission in connection with a butterfly valve angle DKI and/or a gas pedal angle and/or a motor load, an upshift command of the automatic transmission in connection with a relative change of the angle of the butterfly valve DKI or the angle of the gas pedal or of the motor load, an upshift command of the automatic transmission in connection with a negative gradient of the butterfly valve angle DKI or the gas pedal angle or the motor load, an upshift command of the automatic transmission in connection with a quantitative overshooting of the negative gradient of the butterfly valve angle DKI or of the gas pedal angle or the motor load exceeds a threshold, a status "start-up shift element closed", falling below a threshold of the output speed n_ab of the automatic transmission, as well as a current gear of the automatic transmission. The upshift command can occur automatically by the transmission control device or can be specified manually by the driver via the gear selector device. The individual conditions or parameters that are used to build the start conditions for the simulation of a freewheeling condition of the load reduction shift of the automatic transmission can, of course, also be logically combined with an "AND" and/or an "OR" operation, or employ a more complex algorithm.

According to the present invention, the clutch pressure p_K of the start-up shift element is lowered from its initial pressure p1 (pressure level prior to shifting) to a defined open pressure p3 at a time t8, that is, with the shift command G3→G4, such that the start-up shift element (as an exemplary shift element that is used to simulate the free-wheeling condition in the course of the load reduction shift) is taken to a defined slip operation. Preferably, at this time, the pressure level of p3 is in a range just above the fill pressure of the start-up shift element, such that a piston of a hydraulic servo device of the start-up shift element still contacts discs of the start-up shift element, and that the start-up shift element can still transmit a small defined torque. The pressure reduction of the clutch pressure p_K from p1 to p3 preferably occurs abruptly, however, it can also occur in a damped manner via application of a non-linear filter function. Due to the pressure reduction of the clutch pressure p_K to p3, the turbine speed n_t drops quickly to a value in the range of the idle speed of the drive motor. The brief time offset between the gear shift command G3→G4 and the reaction of the turbine speed n_t is a consequence of the obligatory reaction times of the hydraulic control and the servo devices of the shift-mode-specific controlled shift elements. As can be seen from the time profile of the output speed n_ab of the automatic transmission, a deceleration of the motor vehicle occurs, as well, when the turbine speed begins to drop.

Analogous to the simulation of a free-wheeling condition for the coasting-to-stop shift described above, in an advantageous embodiment of the simulation of the free-wheeling condition at the load reduction shift, it is preferred that the open pressure p3 is based on a fill pressure of the start-up shift element, where the fill pressure has been determined adaptively in the course of a stop decoupling function, whereby application of a offset is superposed on the fill pressure. This pressure offset is specified, for example, as a function of one or more of the following parameters: shift mode, current gear, torque to be transmitted, angle of the butterfly valve or of the gas pedal, relative change of the angle of the butterfly valve or of the gas pedal, gradient of the angle of the butterfly valve or of the gas pedal, motor or turbine speed, output speed, gradient of the output speed, transmission temperature. Of course, the pressure offset may also be adaptive. As a rule, the open pressure p3 is always greater than the fill pressure of the stop decouple function, which avoids too large a drop in the vehicle acceleration at the beginning of the load reduction shift. Expediently, the applied pressure offset itself has no influence on the stop decoupling function.

In a simplified design with regard to the application expenditure, the open pressure p3 may exhibit the same pressure level as a fill pressure of the start-up shift element, determined adaptively in the course of the stop decoupling function, resulting in potentially reduced comfort, in particular at an early termination of the simulation of the free-wheeling simulation condition, for example if the driver steps on the gas pedal during the shift.

A synchronization point 3 of the fourth gear G4 is reached at a time t10. The theoretical synchronization speed of the new gear can be computed in a conventional manner, for example from the output speed n_ab and the known shift step. As can be seen from the turbine speed profile 4, drawn for comparison purposes, without the method according to the present invention, up to this time t10, the turbine speed n_t would have to be matched to the new synchronization speed, due to the overlapping shift, which is particularly sensitive to disturbance quantities and thus affects comfort, due to the influence of rotational mass forces of the drive motor, the low differential speed and the low torque that is to be transmitted.

By reaching, or at least approximately reaching the synchronization point 3 of the fourth gear G4 as the new target gear, the turbine speed n_t is raised to the speed level of the new gear by a closing procedure of the start-up shift element that is carried out in a typical controlled manner. In the presented example, a pressure ramp p31 is started that raises the clutch pressure p_K from the open pressure p3 again to the initial pressure p1. The pressure gradient, or the duration t11-t10, of the pressure ramp p31 is preferably applied in a gear-dependent manner to achieve optimum shifting comfort. Of course, the pressure increase from p3 to p1 can also be achieved via application of a non-linear filter function that may also be applied corresponding to the respective gear. In a different embodiment, the pressure increase from p3 to p1 can be achieved via a known turbine speed or differential speed control of the start-up shift element, for example, via an already existing closing control of the stop decoupling function. If the transmission provides that in the new target gear of the acceleration upshift, a pressure level different than the initial pressure p1 is set to a pressure outside of shifting, the pressure increase is, of course modified accordingly, such that at the time t11, the required pressure outside of shifting procedure is reached in the new target gear.

If, in the course of the simulation of the free-wheeling condition at a load reduction shift, the function is exited, then a special motor intervention function can be provided to increase the comfort, simultaneous with raising the clutch pressure in a controlled manner to the respective pressure outside of shifting level conditions in the currently set gear, in order to influence (in general to reduce) the torque that is to be transmitted by the start-up shift element and/or to delay or dampen the torque build-up. As has already been described for a coasting-to-stop shift, the controlled increase of the clutch pressure itself to the required pressure level of the currently used gear, can be carried out as a function of at least one of the torque to be transmitted, the motor or turbine speed, the output speed, the relative change in the angle of the butterfly valve or of the gas pedal, the angle gradient of the butterfly valve or of the gas pedal, and the transmission temperature.

Of course, application of a motor intervention function can also be provided during the "normal" controlled increase of the clutch pressure p_K from the open pressure p3 to the initial pressure p1, or to the pressure level specified from the transmission section outside the shifting in the new target gear.

One feature of the invention preferably provides different starting conditions for deceleration shifts that are demanded automatically by the transmission control device, than those demanded for manually by the driver. Based on the idea that the driver at a manual gear selection can also specify non-comfort-critical deceleration shifts, that do not require special handling, according to the present invention, a threshold of the output speed of the automatic transmission or a threshold of a vehicle speed corresponding to the current gear must be undershot, for a manually demanded deceleration downshift as well as a manually demanded deceleration upshift, in order to start the simulation of the free-wheeling condition subject to the invention. Combined with this start condition is at least one logic "AND" operation, or its equivalent, to start the simulation algorithm that is assigned to the manually demanded shift mode. It is expedient to set this output speed threshold or the vehicle speed threshold to a relatively small value, thus largely sparing the shift element whose slip is used to simulate the free-wheeling condition of the respective shift unnecessary wear.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. A method for controlling a gear shift in an automatic transmission of a motor vehicle, wherein said gear shift is carried out as a deceleration shift using at least one engaging shifting element and without use of a mechanical free-wheeling condition, comprising simulating, during the shifting sequence of the deceleration shift, a free-wheeling condition, wheareby an input speed of said automatic transmission drops during the deceleration shift, is simulated by selectively controlling clutch slip of a second shift element of the automatic transmission that is located in the power flow path.

2. A method as set forth in claim 1, wherein the free-wheeling condition of the deceleration shift is simulated partial engagement of a start-up shift element of the automatic transmission.

3. A method as set forth in claim 1, wherein the deceleration shift is a deceleration downshift of the automatic transmission selected from the group consisting of an automatic coast-to-stop shift of the automatic transmission, for a coast-to-stop procedure of the motor vehicle, and or as a deceleration downshift that is specified by a driver of the motor vehicle through use of a gear selector device.

4. A method as set forth in claim 1, wherein the deceleration shift is a deceleration upshift of the automatic transmission, selected from the group consisting of as an automatic load reduction shift, and a deceleration upshift that is specified by a driver of the motor vehicle through use of a gear selector device.

5. A method as set forth in claim 3, further comprising the steps of:

lowering a clutch pressure (p_K) of the shift element that is used for simulating the free-wheeling condition of the deceleration shift from an initial pressure (p1), prior to shifting, to a defined stand-by pressure (p2), upon recognition of shift-mode-specific start conditions for the simulation of the free-wheeling condition at the deceleration downshift, whereby the stand-by pressure (p2) is higher than a known fill pressure of the shift element and a deceleration factor present at the shift element can be transferred by the shift element without slip;

after lowering to the stand-by pressure (p2), maintaining the clutch pressure (p_K) at the stand-by pressure (p2) until a condition selected from the group consisting of a shift command for carrying out the deceleration downshift is recognized, or and the shift-mode-specific start conditions are no longer met;

in case the shift-mode-specific start conditions are not met, immediately raising the clutch pressure (p_K) to the initial pressure (p1) prior to shifting;

upon recognizing the shift command for carrying out the deceleration downshift, lowering the clutch pressure (p_K) to a defined open pressure (p3), such that the shift element is at least taken to state selected from the group consisting of a defined slip operation or a fully opened condition;

after lowering to the open pressure (p3), maintaining the clutch pressure (p_K) at the level of the open pressure (p3), until a synchronization point (2, 1) of a target gear (G2, G1) of the deceleration downshift is at least approximately reached;

upon or at least approximately reaching the synchronization point (2, 1) of the target gear (G2, G1) of the deceleration downshift, raising the clutch pressure (p_K) from the open pressure (p3) to the stand-by pressure (p2); and after raising to the stand-by pressure (p2), maintaining the clutch pressure (p_K) at the stand-by pressure (p2) until a condition selected from the group consisting of the coast-to-stop procedure of the motor vehicle is finished, the shift command for performing an additional deceleration down shift is recognized, or the shift-mode-specific start conditions of the simulation of the free-wheeling conditions are no longer met.

6. A method as set forth in claim 5, wherein the shift-mode-specific start conditions for the simulation of the free-wheeling condition for the deceleration downshift are established based on at least one of the following:

a closed status of the shift element that is used for simulating the free-wheeling condition of the deceleration downshift, a current gear of the automatic transmission, a gear shift signal of the gear selector device of the driver, a deceleration operation status of the status automatic transmission, a butterfly valve angle (DKI) is close to zero, a gas pedal angle is close to zero, and/or a motor load is close to zero, a threshold of an output speed (n_ab) of the automatic transmission is undershot, a status "vehicle brake stepped on", a brake light signal, a brake pressure signal, and a gradient of the output speed (n_ab) of the automatic transmission is exceeded.

7. A method as set forth in claim 4, further comprising the steps of:

upon recognition of shift-mode-specific start conditions for the simulation of the free-wheeling condition at the deceleration upshift, lowering a clutch pressure (p_K) of the shift element that is used for simulating the free-wheeling condition of the deceleration shift from an initial pressure (p1) prior to shifting to a defined open pressure (p3), such that the shift element is at least taken to a state selected from the group consisting of a defined slip operation and a fully opened condition, after lowering to the open pressure (p3), maintaining the clutch pressure (p_K) at the open pressure (p3) until a synchronization point (3) of a target gear (G4) of the deceleration upshift is at least approximately reached, and upon at least approximately reaching the synchronization point (3) of the target gear (G4) of the deceleration upshift, raising the clutch pressure (p_K) from the open pressure (p3) to a pressure selected from the group consisting of the initial pressure (p1), and a pressure level specified by the transmission outside of shifting in the target gear of the deceleration upshift according to at least one of a defined pressure ramp (p31), and a non-linear filter function.

8. A method as set forth in claim 7, wherein the shift-mode-specific start conditions for the simulation of the free-wheeling condition for the deceleration upshift are established based on at least one of the following conditions or parameters:
   a close status of the shift element that is used for simulating the free-wheeling condition of the deceleration downshift,
   a current gear of the automatic transmission,
   an upshift command of the automatic transmission,
   a gear shift signal of the gear selector device of the driver,
   status an acceleration/deceleration change status of the automatic transmission,
   a butterfly valve angle (DKI),
   a gas pedal angle,
   a motor load,
   a relative change of the butterfly valve angle (DKI),
   a relative change of the gas pedal angle or the motor load,
   a negative gradient of the butterfly valve angle (DKI),
   a negative gradient of the gas pedal angle,
   a negative gradient of the motor load is negative,
   an amount for the negative gradient of the butterfly valve angle (DKI) exceeds a threshold,
   an amount for the negative gradient of the gas pedal angle or the motor load exceeds a threshold, and
   a threshold of an output speed (n_ab) of the automatic transmission is undershot.

9. A method as set forth in claim 5, wherein a gear-dependent threshold of an output speed (n_ab) of the automatic transmission must be undershot in order to trigger the decrease of the clutch pressure (p_K) to the open pressure (p3), when the shift command for carrying out the deceleration downshift has been specified manually by the driver through use of a gear selector device.

10. A method as set forth in claim 5, wherein the specified open pressure (p3) is in a range just above the fill pressure of the start-up shift element that is used to simulate the freewheeling condition of the deceleration shift.

11. A method as set forth in claim 1, wherein characterized in that a fill pressure of the start-up shift element that is used to simulate the freewheeling condition of the deceleration shift is determined adaptively based on data acquired during a stop decoupling function.

12. A method as set forth in claim 10, wherein the open pressure (p3) is determined based on the fill pressure of the start-up shift element that is used to simulate the freewheeling condition of the deceleration shift and a shift-mode-specific pressure offset.

13. A method as set forth in claim 12, wherein the pressure offset is determined based on a function of at least one of the following parameters: shift mode, current gear, torque to be transmitted, angle of butterfly valve or gas pedal, relative change in the angle of the butterfly valve, relative change in the angle of the gas pedal, butterfly valve angle gradient, or gas pedal angle gradient, speed of motor, speed of turbine, output speed, output speed gradient, and temperature of transmission.

14. A method as set forth in claim 12, wherein the pressure offset is adaptively controlled based on prior use.

15. A method as set forth in claim 5, wherein the drop in the clutch pressure (p_K) from a pressure selected from the group consisting of the initial pressure (p1), and the stand-by pressure (p2), to the open pressure (p3) occurs abruptly to immediately disengage the shift element.

16. A method as set forth in claim 5, wherein the drop in the clutch pressure (p_K) from a pressure selected from the group consisting of the initial pressure (p1), and or the stand-by pressure (p2), to the open pressure (p3) occurs in a damped manner based on application of a non-linear filter function to gradually disengage the shift element.

17. A method as set forth in claim 5, wherein the rise in the clutch pressure (p_K) from the open pressure (p3) to a pressure selected from the group consisting of the stand-by pressure (p2), the initial pressure (p1), or and a pressure level specified by the transmission outside of shifting in the target gear of the deceleration shift, is ramped over time (p32, p31).

18. A method as set forth in claim 5, wherein the rise in the clutch pressure (p_K) from the open pressure (p3) to a pressure selected from the group consisting of the stand-by pressure (p2), the initial pressure (p1), and a pressure level specified by the transmission outside of shifting in the target gear of the deceleration shift, is based on application of a non-linear filter function.

19. A method as set forth in claim 17, wherein a pressure transition selected from the group consisting of a gradient of the pressure ramp (p32, p31), a controlled increase of the pressure ramp (p32, p31), the pressure increase from the open pressure (p3) to the stand-by pressure (p2), the pressure increase from the open pressure (p3) to the initial pressure (p1), the pressure increase from the open pressure (p3) to the pressure level in the target gear of the deceleration shift specified by the transmission, is based on a corresponding gear ratio.

20. A method as set forth in claim 5, wherein the rise in the clutch pressure (p_K) from the open pressure (p3) to a pressure selected from the group consisting of the stand-by pressure (p2), the initial pressure (p1), or and a pressure level specified by the transmission outside of shifting in the target gear of the deceleration shift, occurs under control of a parameter selected from the group consisting of the turbine speed (n_t), and a control of the differential speed of the shift element that is used to simulate the free-wheeling condition of the deceleration shift.

21. A method as set forth in claim 5, wherein the stand-by pressure (p2) is established corresponding to a transmission temperature.

22. A method as set forth in claim 5, wherein the stand-by pressure (p2) is established corresponding to a pressure selected from the group consisting of the open pressure (p3), and the fill pressure of the shift element that is used to simulate the free-wheeling condition of the deceleration shift.

23. A method as set forth in claim 5, wherein the drop in the clutch pressure (p_K) from the initial pressure (p1) to the stand-by pressure (p2) occurs abruptly to immediately disengage the shift element.

24. A method as set forth in claim 5, wherein the drop in the clutch pressure (p_K) from the initial pressure (p1) to the stand-by pressure (p2) occurs in a damped manner based on application of a non-linear filter function to gradually disengage the shift element.

25. A method as set forth in claim 5, wherein at least during a portion of the time-course of the rise of the clutch pressure (p_K) to a pressure selected from the group consisting of the stand-by pressure (p2), the initial pressure (p1), and the pressure level specified by the transmission outside shifting in the target gear of the deceleration shift, a motor intervention is provided that modifies a transmission input torque, selected from the group consisting of reducing a transmission input torque, damping a build-up of the transmission input torque, and delaying a buildup of the transmission input torque.

26. A method as set forth in claim 25, wherein the motor intervention is shift-mode-specific.

* * * * *